Jan. 19, 1937.    D. M. SOLENBERGER    2,068,115
PISTON SEALING DEVICE
Filed Dec. 28, 1935
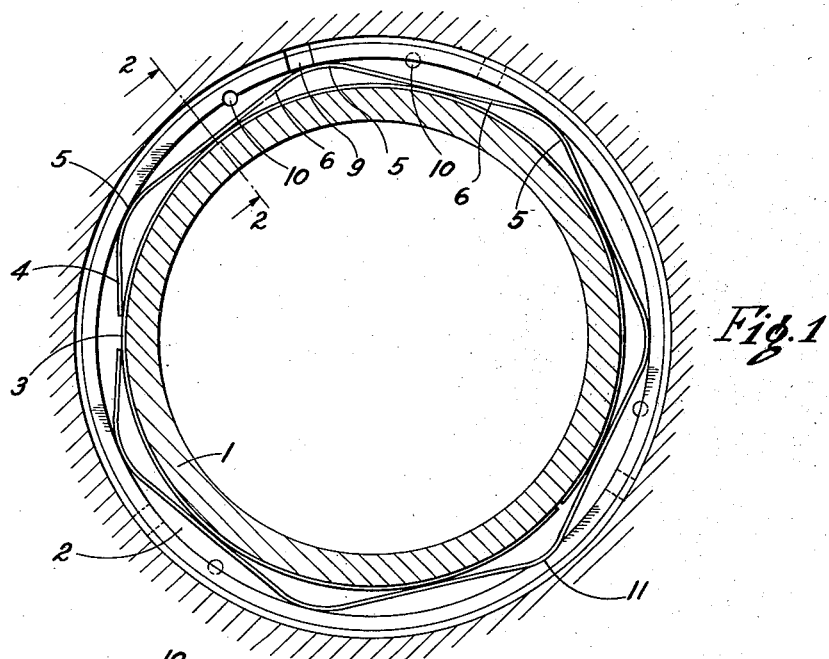
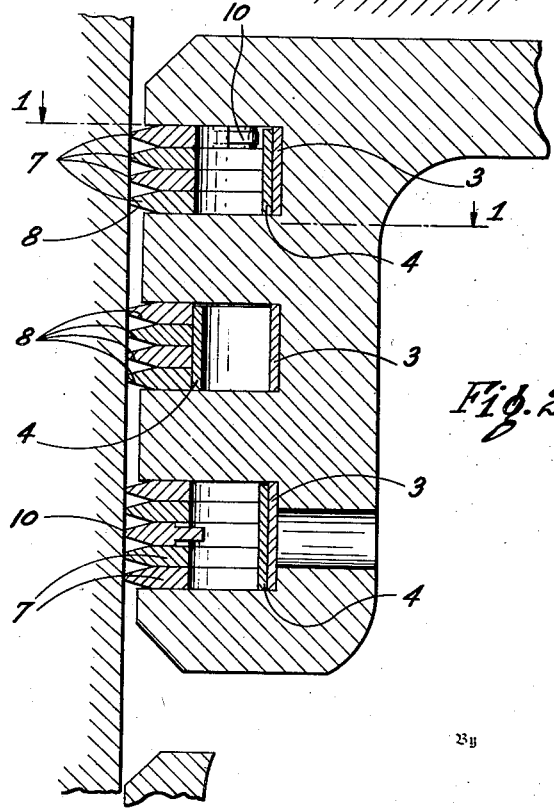
Inventor
DEAN M. SOLENBERGER
By Richey & Watts
Attorneys Patented Jan. 19, 1937

2,068,115

UNITED STATES PATENT OFFICE 2,068,115

PISTON SEALING DEVICE

Dean M. Solenberger, Cleveland, Ohio, assignor to Simplex Products Corporation, a corporation of Ohio Application December 28, 1935, Serial No. 56,570

10 Claims. (Cl. 309—29)

This invention relates to piston sealing devices and more particularly to an improved composite piston packing for use in high speed, high compression internal combustion engines and the like.

The general purpose of the invention is to provide a more complete seal than has heretofore been possible between a piston and the wall of the cylinder within which the piston operates, thus effectively preventing the movement of fluid past the piston rings while maintaining the lubricant film on the cylinder wall at the lowest safe minimum thickness which will prevent wear and provide satisfactory lubrication.

In my previously filed co-pending United States patent applications, Serial No. 708,916, filed January 29, 1934, Serial No. 715,230, filed March 12, 1934, Serial No. 6022 filed February 11, 1935, Serial No. 7,121, filed February 18, 1935 and Serial No. 25,637, filed June 8 1935, I have described some of the features of the piston sealing device which is herein described and claimed and the present application is a continuation in part of those previously filed applications, containing common subject matter with the previously filed cases plus data on relationships, not specifically pointed out in the above noted applications, which makes possible a perhaps more accurate definition of the elements which make up my improved piston sealing device.

The present invention makes use of materials which were previously considered entirely unsuitable for piston rings for present day internal combustion engines and further makes possible greatly improved results, insofar as blow-by, oil consumption, heat transfer and overall efficiency are concerned.

Among the objects of my invention are included the provision of a piston sealing device which will function effectively in modern, high speed, high compression engines under the most severe operating conditions where acute problems of piston clearance, cylinder wear, cylinder distortion and lubrication must be successfully met; the provision of a piston sealing device which is extremely simple in form and readily susceptible to very economical manufacture; the provision of a piston sealing device which may be readily installed in an engine and which will not break in handling or in use; the provision of a piston ring which is adapted to fit cylinders which are oversize by as much as .060″; the provision of a piston sealing device which will very quickly conform to and seat itself upon the cylinder wall and will operate at all times to reduce oil consumption and blow-by most effectively while operating with minimum wall friction; and the provision of a piston sealing device which will greatly reduce the inventory, which, with other types of piston rings, must be maintained to properly fit various degrees of oversized cylinders.

I have found that the accomplishment of these objects, which are of vital importance in obtaining the highest efficiency and service from modern high speed internal combustion engines and the like, is dependent upon the provision of a piston sealing device having a certain physical form and having the characteristics of the parts which make up the device related to each other and to the piston and cylinder with which they cooperate in a certain rather definite manner as hereinafter described. I have found also that when piston sealing devices are employed in which my relationships are not maintained substantially within the stated limits my improved results will not be obtained.

The above stated purposes and objects of my invention will appear more fully from the following description of preferred embodiments thereof, reference being had to the accompanying drawing, in which—

Figure 1 is a plan view, partly in section, showing a piston in a cylinder and illustrating one of my sealing devices in place in a ring groove.

Figure 2 is an enlarged vertical cross section through the cylinder and piston shown in Figure 1.

In Figure 1 a piston is seen in cross section at 1 and the ring groove in the piston is indicated at 2. A shim 3, preferably consisting of a thin band of spring steel, may be used as explained later and is illustrated disposed in the base of the ring groove 2. The corrugated expander spring 4 is disposed in the ring groove just outside of the shim 3 and includes a plurality of hump portions 5 connected by intermediate portions 6. Although I have illustrated a single form of expander spring it will be understood that other types of expanding devices adapted to give a distributed radial pressure against the ring sections can be used. As will be later explained, the expander is designed to maintain a desired wall pressure between the laminae or ring sections 7 and the cylinder wall. The shim or shims 3 are utilized only to give the proper wall pressure in cylinders which are oversize. That is in the preferred practice of my invention I provide a group of ring sections and an expander spring which are adapted to operate in a given piston ring groove in a cylinder of a certain diameter. Satisfactory results will be obtained in cylinders which are of this diameter or slightly oversize without the use of any shims. However, when a cylinder is encountered which is, for example, .030" oversize, it is advisable to use a shim 3 in order that the expander will cause the ring sections to engage the cylinder wall with the proper wall pressure. In cylinders as much as .060" oversize two shims may be required to give the desired wall pressure and obtain the best operating results.

The piston ring proper consists of a plurality of ring sections or laminae 7 (see Fig. 2). These ring sections are split flat ribbons, and may be of the general type illustrated and described in my above noted co-pending United States patent applications. As is clearly seen in Figure 2, the outer edges of these ring sections are preferably chamfered or bevelled as at 8. Although straight bevels are illustrated on both sides of the laminae other ways of reducing the axial thickness of laminae at their peripheries might be employed without departing from my invention. Each of the ring sections shown in Figures 1 and 2 is preferably provided with an inwardly projecting lug 10 which coacts with the expander 4 to locate the ring sections relative to each other and prevent objectionable movement thereof relative to the piston.

In Figure 2 I have shown, in enlarged vertical cross section, a portion of the cylinder wall and the piston. The top two ring grooves are each provided with four ring sections 7 and, as illustrated, a single shim 3 is used behind the expanders 4. The bottom ring, which is the oil ring in the illustrated instance, consists of five ring sections 7, as distinguished from four in the two upper or compression rings, and a shim 3 is shown. As noted above, the shims would be omitted in a "standard" size cylinder.

By chamfering, bevelling, or otherwise reducing the thickness of the peripheral edges of the ring sections 7, rapid initial seating of the rings to minor irregularities in the cylinder wall is facilitated. The relatively thin edges of the malleable ring sections seat rapidly by the combined peening or swaging and wear of the malleable material, and the bevelling of the edges of the laminae prevents sticking of the ring sections in the ring groove which might otherwise occur when ductile, malleable wrought metals are used in a plurality of the laminations. It will be seen that if malleable wrought metal ring sections were made with full thickness edges any feather edges or burrs which were formed on the ring sections during installation or the break-in period might cause the ring sections to stick together and jam in the ring groove. With cast iron this difficulty is not encountered because cast iron does not have the property of forming burrs or a feather edge as do ductile or malleable materials. Therefore, my provision of bevelled or reduced edges on my ring sections is particularly important and advantageous in my malleable wrought metal laminated construction.

It will also be seen that my bevelled edge construction will provide a plurality of oil reservoirs which oil reservoirs are largest during the break-in period. As the thin edges swage in and wear down slightly during the break-in period these oil reservoirs between the ring sections are reduced in capacity so that positive lubrication is obtained with a minimum thickness oil film. By using a plurality of bevelled ring sections I have found that continuous lubrication over the entire bearing surface is maintained while oil consumption is reduced to a minimum and a more complete seal between the cylinder wall and the piston is created and maintained.

In the illustrated embodiment of my invention the ring sections 7 may be considered to be approximately $\frac{1}{32}$" in axial thickness and approximately .080" in radial width. These dimensions may be varied under certain conditions as later explained. The bevelled faces are preferably reduced to about .020" in axial dimension. It will be understood that the above dimensions are merely illustrative and I have found that satisfactory results may be obtained with ring sections having a ratio of radial width to axial thickness between 2 and 6, provided, of course, that the other factors of my invention are properly correlated, as explained later.

It will be seen from the above description that my sealing device comprises essentially two elements, one of which may be termed the sealing element and the other the pressure element. The sealing element, which comprises the laminated ring sections 7, is preferably made of a material having characteristics (fully described later) which are intended to facilitate the creation of the proper sealing contact between the sealing elements and the cylinder wall. In the preferred practice of my invention the sealing element has substantially no inherent wall pressure producing characteristics but is well suited for very effective sealing engagement with the cylinder wall. The cooperative function of the pressure element is to furnish substantially the entire pressure necessary to hold the sealing element against the cylinder wall with the proper sealing contact and to mold the relatively soft ductile ring sections to the cylinder contour under the influence of the expander during the operation of the engine.

Referring to the drawing, it will be noted that each of the sealing members 7 is provided with a lug or projection 10 which cooperates with the pressure element 4 whereby only limited rotation of the ring sections with reference to the pressure element is permitted. This prevents alignment of the gaps of the individual laminae and effects and maintains the general location of the ring sections relative to major irregularities in the cylinder during the break-in period. I have found that, when my preferred combination is used, a swaging and wearing action takes place during the break-in period between the humps of the expander 4 and the inside edges of the ring sections 7 whereby depressions or shallow grooves are formed in the ring sections which effectively prevent relative rotation between the ring sections and the cylinder wall, thus effecting complete conformity between the sealing elements and the minor irregularities in the cylinder wall. One of these depressions is shown in exaggerated form at 11 in Figure 1. It will be understood that the large frictional contact of the pressure member with the bottom of the piston groove prevents its rotation with reference to the piston.

I have found that my sealing members may be made of any suitable material, which will withstand the operating temperature of the engine in which the rings are installed, which is ductile or malleable, as distinguished from brittle (cast iron is "brittle" as the term is used herein), and which has the other physical characteristics described below. Generally, all the metals which are suitable for my sealing elements come under the heading of medium hard, ductile metals.

Among the materials which I have actually and successfully used in internal combustion engines for the sealing elements of my piston packing are: cold rolled low carbon steel having a carbon content of .15% to .25% and having a scleroscope hardness of 44 to 46; steel having a carbon content of .65% to .76% and a scleroscope hardness of 48 to 50; duralumin having a scleroscope hardness of 25 to 27; Monel metal having a scleroscope hardness of 47 to 49; copper having a scleroscope hardness of 26 to 28; brass having a scleroscope hardness of 44 to 50; silicon bronze having the following composition: copper—approximately 96%, silicon—approximately 3%, zinc—approximately 1%, and a trace of lead, and having a scleroscope hardness of 51 to 52; and wrought iron having a scleroscope hardness of 33 to 36.

In some instances it has been found desirable to set up the laminations making up a single piston ring in "sandwich" form; that is to say, bronze laminations may be disposed in a ring groove between steel laminations, the steel laminations engaging the ring groove lands. Other sandwich combinations such as steel outside laminations and aluminum or duralumin inside laminations have been found to operate with entire satisfaction and in some instances with better results than have been obtained with rings made up entirely of one type of laminae. Those skilled in the art will, of course, understand that various other sandwich combinations might be utilized without departing from the spirit of my invention.

In order that those skilled in the art may fully understand my invention I will now set forth the various factors which are correlated to obtain my greatly improved results and the general limits within which I have found that these factors should be maintained in order to insure success.

My sealing members, each made up of a plurality of ring sections, should be of a material which is primarily suitable for giving the most desirable sealing contact in either round or distorted cylinders, and which is preferably adapted to exert little or no force causing the sealing faces of the sealing members to be held against the cylinder wall. I have found that substantially any malleable, ductile, wrought metal (as contrasted with a brittle, cast metal), which will withstand the temperature to which it is subjected in use, and which has a scleroscope hardness of between 20 and 65, will give excellent performance in my piston sealing devices when caused to engage the cylinder wall with a pressure of between approximately 30 and 200 pounds per square inch of the surface contacting with the cylinder wall. I prefer to employ relatively low values of wall pressure, i. e., between approximately 40 and 80 pounds per square inch, because of the reduction in friction which accompanies the use of such lower pressures. However, I have found that wall pressures as high as 200 pounds per square inch may be successfully used without prohibitively high wall friction because of the effective maintenance of the lubricating oil film which results from my beveled laminated sealing members. The unit wall pressures just referred to have been arrived at by measuring the total outward pressure exerted by the expander when in its normal operating position, and then dividing the total pounds pressure exerted by the expander by the number of square inches of contacting surface between the cylinder wall and the sealing device. It will be understood that the unit wall pressure will be somewhat greater during the initial break-in period as the total contact surface is less then that it is after the rings have seated properly.

Although it has been my experience that some metals appear to perform somewhat better in my ring sections under certain circumstances than other metals and although my preferred scleroscope hardness range for the ring sections is from 40 to 55, I am convinced from my experience and tests that all piston sealing devices (comprised of my ring sections and expander), which fulfill the above described conditions will operate with a high degree of efficiency, holding blow-by and oil consumption to comparatively low values.

It is to be understood that wherever the term "ductile" or "wrought" metal or material is used in this specification and the appended claims it is intended to mean, and to include materials having the properties of ductility, bendability, malleability, etc., which are commonly present in materials which have been subjected to working, either hot or cold, during the manufacturing process. The materials specified herein and referred to as ductile or malleable metals are sufficiently ductile to conform, under the pressure of the pressure element, to major irregularities of the cylinder wall and are sufficiently malleable, when used in the structure described, to be readily swaged under the operating conditions of the engine to accurate conformity with minor irregularities in the cylinder wall. The term "ductile" or "wrought" metal, as used herein, is to be distinguished from materials having the common properties of cast iron which is usually brittle and non-bendable as compared to ductile metals. However, if cast metal rings might be produced having the above noted properties of ductility, they would, of course, be included under the term "ductile" or "wrought" metal as used herein.

I have found that the Shore scleroscope hardness of the metals I use for making my ring sections or laminae is an accurate and positive indication of whether or not a material is suitable for use in my piston sealing means, provided, of course, that the metal will withstand the operating temperature of the engine. Although I have used the scleroscope as the means for measuring the hardness of my metals I believe that other recognized hardness measuring instruments might be used. If a metal is of a hardness, regardless of how such hardness is measured, which has the equivalent of approximately from 20 to 65 scleroscope, and if the metal will withstand the operating temperature of the engine, it will work satisfactorily in my piston sealing means and will achieve the results noted above provided the laminae are held against the cylinder wall with the above noted unit pressure of contacting surface of between approximately 30 and 200 pounds per square inch. I have found that rings of a scleroscope hardness substantially lower than 20 give very erratic performance when used in my combination. Likewise, I have found that rings of a hardness substantially above 65 are prone to score the cylinder wall when used in my combination.

Another important characteristic of my sealing members, which is apparently inherent in ductile, wrought metal and which is apparently closely related to the hardness although functionally independent of the hardness in my combination, is that of proper or suitable stiffness or flexibility. I define "suitable stiffness" in my sealing elements, for purposes of this specification and the appended claims, as that degree of stiffness or resistance to bending under load which will permit the pressure exerted by my pressure element to force the sealing element radially outwardly into the major irregularities of a cylinder wall which may be out of round as much as .005" per inch of diameter, and still leave sufficient excess pressure to reduce the lubricant film on the cylinder wall to the minimum thickness for safe operation. The term "suitable stiffness" also contemplates that the stiffness of the sealing members be sufficient to distribute the pressure applied at circumferentially spaced points by the expander, thus providing an even and substantially uniform wall pressure throughout the entire length of contact of the sealing element with the cylinder wall.

In order to determine whether or not a sealing element possesses "suitable stiffness" which will permit its successful use in my combination, I have devised the following method of measuring "stiffness":

When a group of laminated ring sections each approximately .080" in radial width and approximately .030" in axial thickness and having an aggregate axial thickness of approximately ⅛" is supported upon 2" centers and an initial load of one pound applied in a radially outward direction midway between the supporting points, the "stiffness" may be measured by the additional load in pounds which is necessary to produce a deflection at the midpoint of the group of laminations of .010".

In the ideal preferred practice of my invention I use sealing elements whose "stiffness", when a group of ring sections of the above noted dimensions is considered, lies between 4 and 7 pounds and I have found that such elements, when used in combination with my preferred pressure elements, give highly satisfactory operating results. Those familiar with this art will recognize that in present day practice piston ring groove depths and piston clearances increase with piston diameters and that various other factors (such as cutting back the groove lands on larger pistons) change with increase in piston diameter, so that, in relatively large size pistons, (that is, more than about 3½" in diameter) the radial width of the sealing members may in some cases have to be increased over the above noted preferred value of .080" in order to properly support the sealing members in the ring grooves. This increase in radial width would result in a corresponding increase in "stiffness" or load required to deflect a group of such ring sections ⅛" in axial dimension .010" when supported on centers spaced 2". However, such increases in radial width impose no serious limitations upon the performance of my sealing device in relatively large pistons of the type referred to because, as will be appreciated by those skilled in the art, the irregularity or degree of out of roundness of large cylinders is normally less acute than in smaller cylinders and the relatively stiff wider ring sections will conform to such irregularities in larger cylinders with substantially the same degree of accuracy as the less stiff preferred type ring sections will conform to the more acute irregularities of smaller cylinders.

I have found that as a general rule satisfactory results may be obtained as long as the radial width of my sealing members remains between approximately 2% and 3% of the diameter of the piston. In actual tests which I have run, my improved results have been obtained with pistons of approximately 3⅞" in diameter having my sealing devices made up of ring sections approximately .080" in radial width when these ring sections were of such "stiffness" that a load of approximately 6 to 10 pounds was required to deflect a group of said ring sections ⅛" in axial dimension approximately .010". In like manner I have found that for pistons approximately 4½" in diameter employing ring sections .105" in radial width the desired performance was obtained when the ring sections had a "stiffness" of between 14 and 18 pounds. Sealing devices for larger sized pistons may follow the same general proportions.

As a result of my tests and experience with my piston sealing device I am of the opinion that my improved results may be obtained with any size piston using my preferred ring sections, i. e. approximately ₃₂" by approximately .080", in groups of from 3 to 6 laminae when backed up by a pressure element which would provide a unit wall pressure within the ranges noted above and I have given the above examples of ring sections of different radial widths in order that my invention may be more readily applied by those skilled in the art to existing types of pistons.

Although I have noted that the scleroscope hardness of my sealing elements should preferably lie between 20 and 65, the hardness may also be expressed in relation to the hardness of the cylinder wall with which the rings are used. I have found that sealing elements having a scleroscope hardness varying about fifteen points either way from the scleroscope hardness of the cylinder wall will operate successfully provided the other conditions herein stated are fulfilled. Thus in the usual cast iron cylinder having a scleroscope hardness of approximately 35 I prefer to use sealing elements whose hardness lies between 20 and 50, it being understood that I may vary this hardness with that of the cylinder wall.

In preparing the various materials which may be used in my ring sections or laminae the desired hardness may be obtained in a number of well known ways. Various heat treatments may be employed to give the desired hardness, ductility, elasticity, stiffness, etc. The heat treatment, will, of course, vary with the specific material being used for the ring sections but it is entirely within the ability of the skilled metallurgist to determine the proper treatment and produce a material which will fulfill my specifications. In the case of a very soft material, such as low carbon steel, (.15% to .25% carbon) the hardness may, in some cases advantageously and economically be brought up to the desired value by cold working such as rolling. In the case of very hard material, such as hardened high carbon spring steel, the temper may be drawn until the metal comes within my scleroscope limits or until the other characteristics noted herein are obtained. I do not, therefore, claim any particular heat or other treatment for placing the metal of my ring sections in the proper condition to achieve the improved results of my piston sealing device.

My pressure element is preferably a corrugated steel spring as illustrated in the drawing and described above. However, any other means of producing the desired distributed radial pressure may be employed. The pressure points or humps of the illustrated type of sealing element are preferably spaced between 1.2″ and 1.4″ as measured on the chord of the arc between adjacent humps. The material and heat treatment of the pressure element is such that it will exert an outwardly directed radial pressure sufficient to cause a unit wall pressure, calculated as explained before, of between 30 and 200 pounds per square inch. In my preferred practice the unit pressure is maintained within the narrower limits of between 30 and 80 pounds per square inch.

Although I may reduce or increase the distance between humps of my pressure elements and still obtain reasonably satisfactory results I have found that if the distance is reduced much below the limits noted above the flexing of the pressure element or expander may become so severe as to cause premature fatigue failure of this element. Also, when the distance between humps is increased, it is more difficult to obtain the desired uniform wall pressure of the sealing element between humps. If the distance is greatly increased over the limits specified it is impossible to maintain the desired uniform wall pressure between humps without increasing the hardness and stiffness of the sealing element. Such increase precludes the use of materials in the sealing elements which cannot be treated to obtain the hardness and stiffness required and also increases the danger of scoring of the cylinders. Generally speaking, the stiffness required for proper operation is inversely proportional to the number of pressure points or humps in my pressure element. If a pressure element is used having a large number of pressure points a sealing element should be used having stiffness of much lower value than that specified above. In the ideal situation the stiffness would approach zero as the number of pressure points approaches infinity and the term "suitable stiffness" as used and defined herein contemplates this relationship.

In order to obtain the longest life and most satisfactory operation of my piston packing I preferably make my corrugated expander springs of relatively hard spring steel having a scleroscope hardness of between 76 and 86. I have found that excellent results are obtained provided the ratio of the scleroscope hardness of the expander to that of the sealing members is maintained between about 1.2 and 3.5. By providing a relatively hard spring expander and soft ring sections excessive wear and failure of the expander is eliminated and locating and preventing rotation of the rings relative to the cylinder wall is facilitated.

Where the term "thickness" or "axial thickness" is used in this specification and the appended claims it means the thickness of the ring sections or laminae measured in a direction parallel to the longitudinal axis of the cylinder in which the piston and piston rings operate. Where the term "radial width" is used in relation to the ring sections or laminae it is intended to mean the width thereof measured on a line extending radially from the center.

Although I have described the illustrated embodiment of my invention in considerable detail and have described certain specific characteristics and properties of the materials which make up my piston sealing device and certain relationships which preferably exist between the various elements of my device, it will be understood by those skilled in the art that variations and modifications may be made in my invention without departing from the spirit thereof, and I do not, therefore, wish to be limited to the specific data herein given, but claim as my invention all embodiments coming within the scope of the appended claims.

I claim:

1. A composite packing for a piston comprising a series of superposed ring sections of ductile metal, each section having an axial thickness not in excess of approximately $\frac{3}{32}$ inch and having substantially no inherent wall pressure producing characteristics, and an expander contacting said ring sections and tending to distort said ring sections to conform said ring sections to the surface of a cylinder.

2. A composite packing for a piston comprising a series of superposed ring sections of ductile metal, each section having an axial thickness not in excess of approximately $\frac{3}{32}$ inch and having substantially no inherent wall pressure producing characteristics, one or more of said ring sections having peripheral portions reduced in axial thickness whereby the cylinder contacting surfaces of adjacent ring sections are spaced, and an expander contacting said ring sections and tending to distort said ring sections to conform said ring sections to the surface of a cylinder.

3. A composite packing for a piston comprising a series of superposed ring sections of ductile metal having a scleroscope hardness between 20 and 65, each section having an axial thickness not in excess of approximately $\frac{3}{32}$ inch and having substantially no inherent wall pressure producing characteristics, and an expander contacting said ring sections and tending to distort said ring sections to conform said ring sections to the surface of a cylinder.

4. A composite packing for a piston comprising a series of superposed ring sections of ductile metal, each section having an axial thickness not in excess of approximately $\frac{3}{32}$ inch and having substantially no inherent wall pressure producing characteristics, said ring sections having a scleroscope hardness between 20 and 65 and having such stiffness that a load of between 4 pounds and 7 pounds supported at the center of a 2 inch span of a group of ring sections totalling approximately ⅛ inch in axial thickness, each section being approximately 5/64 inch in radial width, will deflect said group approximately .010″ after an initial load of 1 pound has been applied, and an expander contacting said ring sections and tending to distort said ring sections to conform said ring sections to the surface of a cylinder.

5. A composite packing for a piston comprising a series of superposed ring sections of ductile steel having a carbon content of not more than .40%, each section having an axial thickness not in excess of approximately $\frac{3}{32}$ inch and having substantially no inherent wall pressure producing characteristics, and an expander contacting said ring sections and tending to distort said ring sections to conform said ring sections to the surface of a cylinder.

6. A composite packing for a piston comprising a series of superposed ring sections of ductile steel having a carbon content between .15% and .25% and having a scleroscope hardness between 35 and 55, each section having an axial thickness not in excess of approximately $\frac{3}{32}$ inch and having substantially no inherent wall pressure producing characteristics, and an expander contacting said ring sections and tending to distort said ring sections to conform said ring sections to the surface of a cylinder.

7. A composite packing for a piston comprising a series of superposed ring sections of ductile non-ferrous metal, each section having an axial thickness not in excess of approximately 1/32 inch and having substantially no inherent wall pressure producing characteristics, and an expander contacting said ring sections and tending to distort said ring sections to conform said ring sections to the surface of a cylinder.

8. A composite packing for a piston comprising a series of superposed ring sections, some of said ring sections being of different material than others but each being of ductile metal, each section having an axial thickness not in excess of approximately 1/32 inch and having substantially no inherent wall pressure producing characteristics, and an expander contacting said ring sections and tending to distort said ring sections to conform said ring sections to the surface of a cylinder.

9. A composite packing for a piston comprising a series of superposed ring sections of ductile metal, each section having an axial thickness not in excess of approximately 1/32 inch and having substantially no inherent wall pressure producing characteristics, said ring sections having projections extending inwardly from their inner peripheries, and an expander contacting said ring sections and tending to distort said ring sections to conform said ring sections to the surface of a cylinder.

10. A composite packing for a piston including a series of superposed ring sections of ductile metal having a scleroscope hardness between 20 and 65, each section having an axial thickness not in excess of approximately 1/32 inch and having substantially no inherent wall pressure producing characteristics, said ring sections having projections extending radially inwardly from their inner peripheries, and one or more of said ring sections having outer peripheral portions reduced in axial thickness whereby the cylinder contacting surfaces of adjacent ring sections are spaced, and an expander contacting said ring sections and tending to distort said ring sections to conform said ring sections to the surface of a cylinder.

DEAN M. SOLENBERGER.